Patented Sept. 11, 1934

1,973,599

UNITED STATES PATENT OFFICE 1,973,599

MANUFACTURE OF COLD LAID PAVEMENT

Charles M. Baskin, Toronto, Ontario, Canada, assignor to Standard Oil Development Company, a corporation of Delaware No Drawing. Application February 28, 1931, Serial No. 519,283

6 Claims. (Cl. 106—31)

This invention relates to the manufacture of asphalt compositions of the so-called "cold laid" type and more particularly to compositions of that class which are adapted to be emulsified by the presence of relatively small amounts of emulsifying agents associated with the asphalt.

It is common practice to prepare aqueous asphalt emulsions which are transported to the places where they are to be used. This involves the carrying of large amounts of water. Moreover there is often the danger of breaking the emulsion during transit. This may be caused either by agitation of the emulsion or by the accidental access of dust or other substances. A typical process for making asphalt emulsions of the type referred to includes the addition of an emulsifying agent to asphalt and the admixture of the resulting composition with an aqueous alkaline solution. The resulting emulsion is applied to the mineral aggregate or similar material which is to be bonded by the asphalt.

I have discovered that substantial advantages may be obtained by direct emulsification of the asphalt on the aggregate. The following example will illustrate the use of the invention:

Asphalt of any ordinary commercial grade is mixed with a small percentage of a suitable emulsifying agent such as fatty acids of the type of oleic or stearic acid, alkali metal soaps, sulphonated oils, or other substances capable of emulsifying asphalt, for example colloidal clay. Many of these substances are known in the art and need not be further defined here. The percentages of emulsifying agent required are small, usually about .25% to 1.5% by weight of the asphalt.

The asphalt and emulsifying agent are thoroughly mixed, preferably in substantially anhydrous state, while applying sufficient heat to melt the components. This mixture is then shipped to the point where it is to be used. When the invention is to be used in road construction, the aggregate is thoroughly wetted with an aqueous solution of an alkali. This solution is preferably a .1% to 1.5% solution of sodium hydroxid, although many other alkaline substances can be used, such as lime solutions. The amount of the alkaline solution to be used will vary with the conditions. In general, however, I prefer to use about 20% as much by volume of the solution as of the asphalt mixture.

The best way to secure proper emulsification on the aggregate is to feed the latter into the usual type of pug mill or other mixer, at the same time supplying through a measuring device the required quantity of alkaline solution. After the aggregate is thoroughly wetted, the asphalt, heated to the proper temperature, is fed into the mixer. The alkaline solution should be sprayed or otherwise injected so as to coat all the particles of aggregate. This can be done in a highly satisfactory manner by atomizing the solution with steam or air. The solid or semi-solid asphalt containing the emulsifying agent should be melted and similarly atomized.

The ingredients, thoroughly commingled in the mixer, are discharged upon the area to be paved or otherwise treated. It is not required that the mixture be applied at temperature above atmospheric.

When operating as described it is unnecessary to "prime" or otherwise treat aggregate except by the application of the alkaline solution. The water required for the emulsification can be obtained locally, thus avoiding any transportation charges except for the asphalt mixture. Direct emulsification as described also makes it possible to obtain a higher percentage of asphalt in the emulsion than when the emulsion itself is shipped.

Any suitable form of mineral aggregate may be used, such as crushed stone or gravel. The presence of sand or other finely divided material is not an objection when the present invention is used. As noted above, finely divided materials have heretofore had a tendency to break the preformed asphalt emulsion. In case vegetable or oily matter is present in the form of films on the mineral aggregate, some additional mixing may be required. Otherwise such films have no detrimental effect on the emulsions made by the present invention.

While reference has been made particularly to the treatment of asphalt, it will be understood that the principles disclosed are applicable to any equivalent bituminous material.

Numerous other uses of the invention may be made, for example in the preparation of roofing materials, insulation and pipe covering, and the like.

Various changes and alternative arrangements may be made within the scope of the appended claims, in which it is my intention to claim all novelty inherent in the invention as broadly as the prior art permits.

I claim:

1. Method of making an asphalt emulsion, comprising mixing asphalt with an emulsifying agent in a substantially anhydrous state, and commingling the mixture so produced with an inorganic alkaline solution associated with the substance which is to be bonded by the asphalt.

2. Method according to claim 1, in which the mixture of asphalt and emulsifier is commingled with a solution of caustic alkali.

3. Method of bonding mineral aggregate comprising applying asphalt to mineral aggregate carrying an inorganic alkaline solution and emulsifying the asphalt on the aggregate with the aid of an organic emulsifying agent.

4. Method of bonding a mineral aggregate, comprising forming a mixture of asphalt and an emulsifying agent, wetting the mineral aggregate with an alkaline solution, and intimately commingling the mixture of asphalt and emulsifying agent with the wetted aggregate.

5. Method of bonding a mineral aggregate, comprising forming a mixture of asphalt and an emulsifying agent, wetting the aggregate with an alkaline solution, melting the mixture of asphalt and emplsifying agent, and spraying it upon the wetted aggregate while the same is being agitated.

6. Method of making and applying bonded mineral aggregate, comprising forming a mixture of asphalt and an emulsifying agent, charging the mineral agregate into a mixer, spraying it therein with a solution of caustic alkali, then spraying the wetted aggregate with the mixture of asphalt and emulsifying agent, and discharging the resulting asphalt-coated aggregate at the point where it is to be used.

CHARLES M. BASKIN.